United States Patent [19]
Casey

[11] 3,898,741
[45] Aug. 12, 1975

[54] MEASURING APPARATUS

[75] Inventor: Wilfred Casey, Preston, England

[73] Assignee: British Nuclear Fuels Limited, Lancashire, England

[22] Filed: Apr. 8, 1974

[21] Appl. No.: 459,228

[30] Foreign Application Priority Data
May 21, 1973 United Kingdom............... 24214/73

[52] U.S. Cl. ................................. 33/178 F; 33/302
[51] Int. Cl.² ........................................... G01B 5/12
[58] Field of Search .......................... 33/178 F, 302

[56] References Cited
UNITED STATES PATENTS
2,588,717   3/1952   Goodwin ........................... 33/178 F
2,854,758   10/1958   Owen ................................ 33/178 F
2,973,583   3/1961   Stolle................................ 33/178 F Primary Examiner—Richard E. Aegerter
Assistant Examiner—Willis Little
Attorney, Agent, or Firm—Larson, Taylor and Hinds

[57] ABSTRACT

Apparatus for use in taking measurements in downwardly extending channels resides in a probe on which is fixed a track and a carriage captive on the track carries measuring transducers with electrical outputs. The probe is suspended in the channel and moved upwards, stepwise. At each position the carriage is traversed along the track and the response of the transducers which may be electrical signals indicative of channel profile dimensions are carried by an electrical conductor to indicators situated remote from the probe.

11 Claims, 7 Drawing Figures 3,898,741

MEASURING APPARATUS

BACKGROUND OF THE INVENTION

This invention relates to measuring apparatus including a probe for insertion into a downwardly extending channel for the purpose of making certain measurements mainly linear dimensions. The invention chiefly relates to measuring apparatus for gauging the wall profiles of such channels in nuclear reactors but is equally applicable to dimensional investigation of other channels such as the bores of pipes and other conduits in chemical and process plants.

SUMMARY OF THE INVENTION

According to the invention, measuring apparatus for making measurements within a downwardly extending channel comprises a probe carrying a measurement transducer giving an electrical output, a probe support means for supporting the probe and moving it stepwise along the channel, the support means having an electrical transmission line associated with it connected to transmit the electrical output of the transducer to an indicator situated remote from the probe.

Preferably the probe is adapted for carrying a track on which is captive a carriage freely movable on the track between end members. Advantageously the suspension of the probe, its incremental travel up the channel and the traverse of the carriage are effected by manipulation of the probe support means, preferably a cable having an electrically conductive core. For instance, the probe may then comprise a carriage for measuring transducers having electrical outputs, electrical connections between the transducers and the core of the cable by which the probe is suspended, a track to which the carriage is attached, an anchorage on the carriage for the cable and gripping members mounted on the probe and biased towards an extended position, the gripping members being partially retracted when the weight of the probe is taken by the cable to allow the probe to be hoisted up the channel but moving into an extended position to grip the channel wall when the cable tension is relaxed.

DESCRIPTION OF THE DRAWINGS

In order that the invention may be better understood one form of measuring apparatus embodying the invention will now be described with reference to the accompanying drawings in which.

DESCRIPTION OF THE PREFERRED EMBODIMENTS

Figure 1:
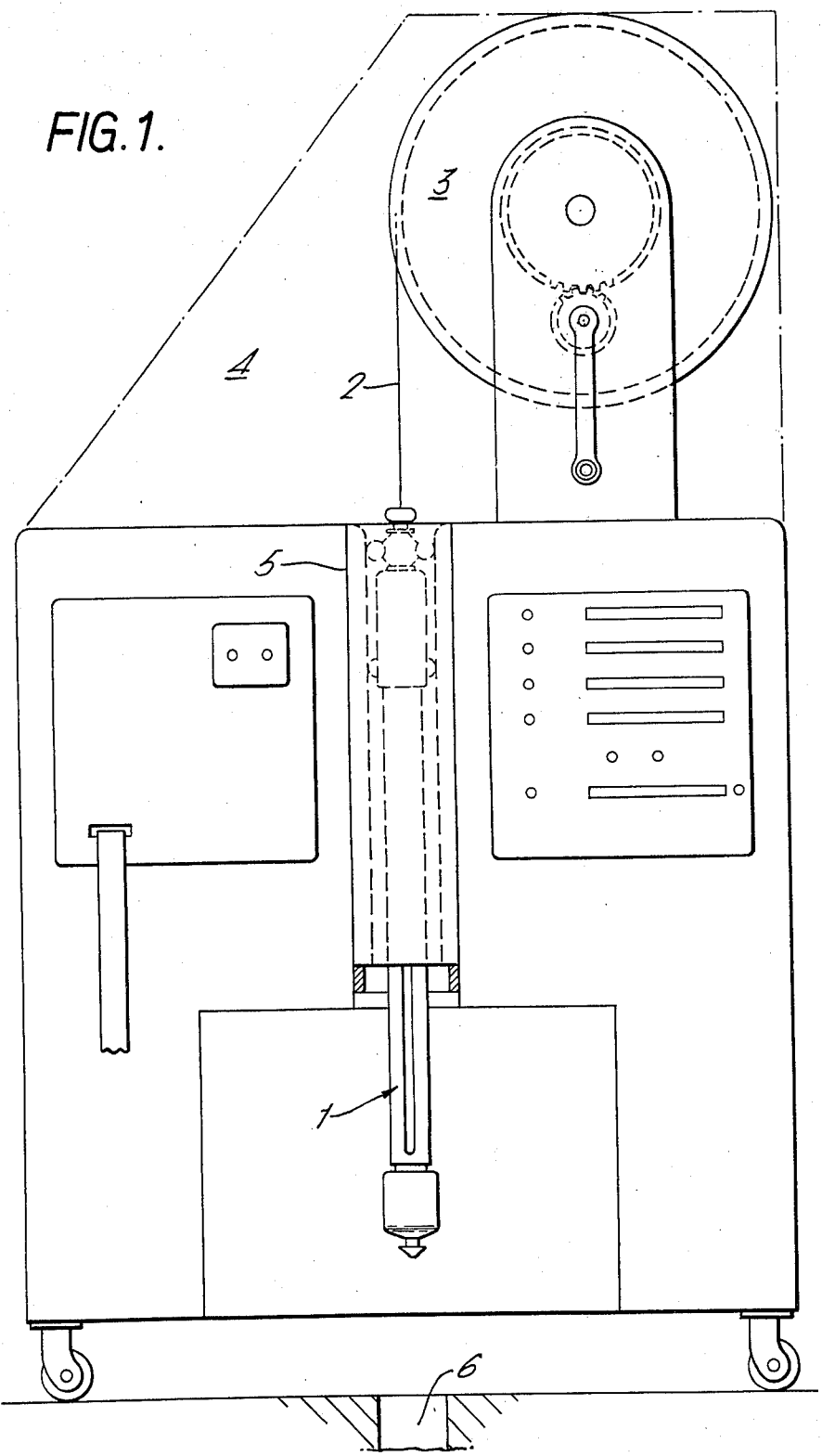
FIG. 1 is a side elevation of the apparatus with the probe in the raised position.

As shown in FIG. 1 the apparatus comprises a probe 1 carried at the end of a support means in the form of a cable 2 wound on a winch drum 3 which is in turn mounted on a trolley 4. The cable 2 has an electrically conductive core to carry signals from transducers mounted in the probe to amplifiers inside the drum 3 giving an output to a data display means on the side of the trolley. In FIG. 1 the probe is shown in the raised position within a sleeve 5 and the trolley is manoeuverable to align the sleeve 5 with a nuclear reactor coolant channel 6 which is to be dimensionally investigated.

Figure 2A:
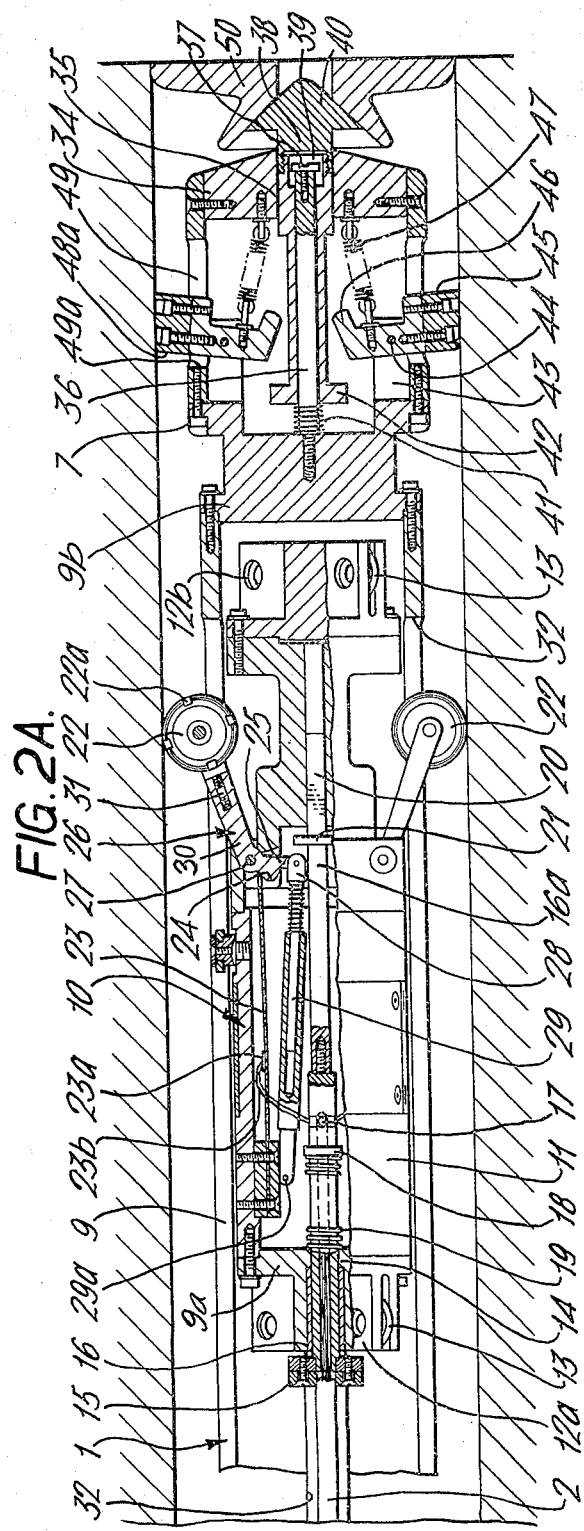
FIGS. 2A and 2B, taken together, show a side elevation of the probe partly in cross-section.
Figure 2B:
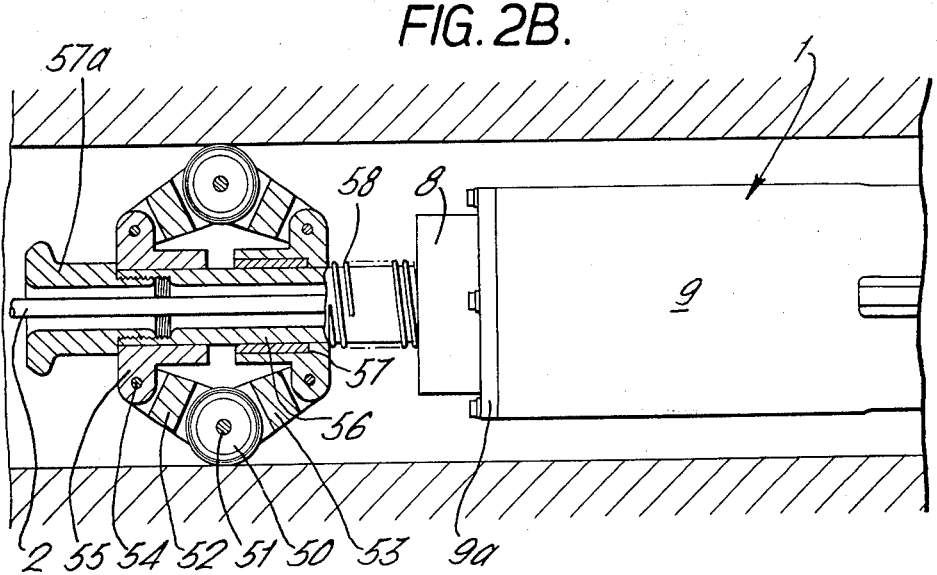

The probe is shown in more detail in FIGS. 2A, 2B but briefly described may be said to comprise a number of extensible grippers 45 for supporting the weight of the probe off the channel wall whilst a carriage 10 carrying measurement transducers is traversed over a track, mounted between nose and tail pieces 7, 8 by pulling on the cable, whilst the cable is relieved of the weight of the probe. Measurements made by the transducers, which have electrical outputs, during the traverse of the carriage, are transmitted to the amplifiers in the drum 3 by the cable 2. The probe grippers 45 are automatically loosened by continuing to pull the cable when the carriage has completed its traverse and the probe is lifted to the next increment of channel to be measured partially overlapping the first. The probe is then locked against the channel wall by lowering it slightly. The carriage is then lowered under its own weight to the bottom of the track and the traverse of the carriage is repeated.

Figure 3:
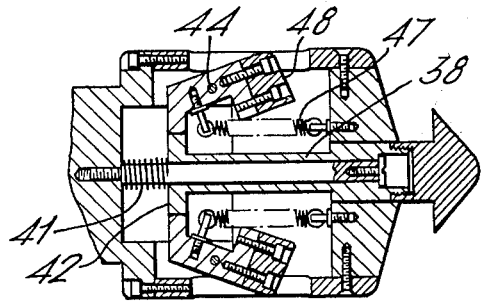
FIG. 3 is a view of part of FIG. 2 with the gripping members fully retracted.

Referring now to FIGS. 2A, 2B and 3, there is shown the probe 1 comprising a nose piece 7 and a tail passes freely 8 attached at opposite ends of a tube 9, the inner wall of which forms a track for a carriage 10 which is free to slide within the tube bore but captive within it, between end stops 9a, 9b. The carriage 1 comprises a generally cylindrical casing 11 with end projections 12a, 12b in each of which is journalled 4 wheels 13 which engage the bore of the casing at 90° spacing and support the carriage in the tube 9. The upper end projection 12a is pierced by a hole 14. The cable 2 as shown in FIG. 2a freely through the tail piece 8, along the axis of the probe and where the cable enters the hole 14, its outer steel casing is gripped in a cable clamp 15 attached to the protruding end of a sleeve 16 slidable in the hole 14. The electrically conductive core of the cable extends within the sleeve to emerge as several separate conductors through a hole 17. The slidable sleeve 16 extends into the casing 11 where it has a shoulder 18 which forms one abutment for a helical spring 19, the other abutment being the adjacent face of end projection 12a. A further extension of the sleeve 16 is a spindle 16a extending from the sleeve into a hole 20 in the lower end projections 12b. The end part of the spindle 16a and the hole 20 are of square cross-section to prevent rotation between spindle and the carriage. A shoulder 21 is formed on the spindle 16a for a purpose explained below. The spring 19 and the limited sliding movement allowed to the cable anchorage has a shock absorbing function, should the probe be accidently dropped down the channel. The main function of the sliding sleeve 14 and spindle 16a is, however, to retract four measuring rollers 22 as the probe is lowered down the channel. The rollers 22 form part of the more important transducer mounted on the carriage 11 for measuring the profile of the channel wall, or variations in channel diameter as will now be explained.

There are four rollers 22, and each co-operates with a transducer for channel profile measuring. One transducer is shown in cross-section in FIG. 2A.

The transducer includes a thin metal strip 23, glued to the surface of which is a strain gauge 23a. The strip 23 is clamped at one end to the inside of the carriage wall near the upper end of the carriage. The strip extends downwardly so that its free end bears upon a projection 24 formed on the short arm 25 of a bell-crank lever 26. The latter is fulcrumed at 27 on the carriage and the end of the short arm 25 if connected by a knuckle joint 28 to one end of an extensible spring loaded link 29. The other end of the link is pivotally mounted on the carriage 10 at 29a. The longer arm and 30 of the bell-crank lever 26 acts as a feeler arm is forked and carries the axle for the roller 22. One of the rollers 22, viz that shown in cross-section in FIG. 2A is adapted for the purpose of gauging the axial position of the probe along the channel by causing pulses to be transmitted to the surface as the roller rotates. To this end the roller 22 is non-magnetic but has four magnets 22a embedded in its periphery at 90° spacings. In the yoke of the fork is a magnetic pick up device 31 comprising a spring loaded magnet giving an electrical output pulse each time a magnet 22a on the roller 22 passes the yoke. These pulses are transmitted by a conductor (not shown), via the cable 2, to yield a signal indicative of the carriage's position along its track and hence along the channel. The rollers 22 rotate during this traverse by their being pressed against the wall of the channel 5 by the springloaded link 29 acting through the bell-crank lever 26. To allow the traversing movement to take place, the casing 11 has an axial slot 32 for each roller 22. Each roller 22 follows the profile of the channel rocking the bell-crank 26 as the channel diameter changes. The crank 26 translates the rocking movements into positive and negative deflections of the strip 23 which are measured by the strain gauges 23a electrically connected to the cable 2 by leads 23b. The carriage itself has wheels 13, as stated, to allow it to run within the tube 9. The wheels 13 are mounted at 90° spacing on each end projection 12a, 12b, so as to contact the inside of the tube 9 between the axial slots 32. The measuring traverse of the carriage 10 is an upward one effected by pulling the cable 2. In order to move the carriage relative to the tube 9 it is necessary to hold the tube 9 in a fixed axial position whilst this pull is made, and of course to relieve the cable of the weight of the probe.

The means for doing this are contained within the nose piece 7. The latter is a short tube, one end of which is attached to the end stop 9b the other closed by a plug 34 having a central hole 35. A spigot 36, fixed to the adjacent face of the end stop 9b protrudes into the hole 35 where at its end an oversized screwhead 37 forms a fixed stop for a plunger 38 slidably mounted on the spigot 36 and within the hole 35. The sliding of plunger 38 is limited by the axial length of a cavity 39 contained in the plunger near its head 40 which terminates in a spike similar in shape to the nose of a fuel element lower support fitting.

The plunger 38 is spring biassed to cause the spiked head to protrude by a helical spring 41 bearing on the outer face of end stop 9b and a flange 42 on the end face of the plunger 38. Mounted on three equispaced webs 43 within the nose piece 7 are pivots 44 on which grippers 45 are pivoted. Each gripper 45 is a lever, the inner ends of which are shaped with a foot 46 and between the foot 46 and the pivot 44 a spring 47 is attached. The other end of the spring 47 is anchored to the plug 34 closing the end of the nose piece 7. The outer end of the gripper has fixed thereon interchangeable gripping shoes 48. Slots 49 are cut in the wall of the nosepiece 7 such that, under the action of tension springs 47, the grippers are rocked to bring the gripping shoes 48 to engage the channel wall. The end face 49a of slots 49 limit the degree of which the grippers can be rocked. It is, of course, necessary to retract the grippers whilst the probe is being lowered down the channel initially, and, for this purpose, the grippers 45 are rotated manually into positions shown in FIG. 3 against the action of the springs 47 so that the foot 46 of each gripper abuts the periphery of the flange 42 on the plunger 38.

The plunger spring 41 maintains the plunger 38 in an extended position, shown in FIG. 3. In this position the foot 46 is in engagement with the flange 42 whilst the probe is lowered down the channel. When the bottom of the channel is reached the plunger is depressed releasing the grippers 45 which are rocked until the shoes 48 engage the channel wall under the action of springs 47. The angle of contact between the shoes 48 and the wall relative to the pivot 44 is such that an upward pull by the cable 2 exerted through the pivot 44 will cause grippers 45 to rotate slightly in a sense to relax their grip and allow the probe to be hoisted by the cable.

At the rear of the probe, a steady is required for the tail piece 8 and this is provided by three rollers 50 arranged to engage the channel wall at 120° spacing; one roller is shown out of plane in the drawing, for clarity. The rollers 50 are freely rotatable on axles 51, each axle being mounted on a pair of pivotal links 52, 53. One link 52 of each pair is pivoted at its end on a pin 54 projecting from a collar 55 fixed to a tube 56 extending rearwardly from tailpiece 8. The other link 53 is pivoted on a sleeve 57 which is slidable on the tube 56. A helical spring 58 urges the sleeve 57 towards the collar 55 and hence biases the rollers 50 radially outwardly into contact with the channel wall. The tube 56 has a short extension 57a with a curved rim to prevent scuffing of the cable 2 where the latter passes into the carriage.

The probe is set up for channel profile measurement before being lowered down the channel by firstly adjusting the metal strips 23 so that the rollers 22, under the action of the spring biassed links 29 give zero, or datum, deflection of the strips 23. The grippers 45 are then moved manually into the retracted position, having first fitted shoes 48 of a thickness appropriate to the bore diameter to be gripped. The plunger 38 is pulled out to hold the grippers retracted. The probe is then suspended by the cable 2, the carriage 10 moving to the top of its travel, whereupon as the cable takes the weight of the probe sliding rod 16 and spindel 16a move upwards against the spring 19 and the shoulder 21 abuts the knuckle 28. The latter moves with the shoulder 21, rotating the bell-crank 26 clockwise, so retracting the rollers 22. The winch is operated to lower the probe to the bottom of the channel where plunger spike 40 is depressed as it engages the channel base fitting 50 so to release the grippers 45. The latter engage the channel wall. As the weight of the probe is now taken by the channel the tension in the cable is relaxed and the spring 19 moves the spindle 16a downwards so that as the shoulder 21 moves away from knuckle 28, the spring loaded rod 29 can extend. In extending, it rocks the bell-crank lever 26 and the rollers 22 move radially outwards to engage the channel wall.

The carriage 10 is then raised in the tube 1, the rollers 13 running on the bore of the tube 1, the rollers 22 on the bore of the channel. Changes in bore profile resulting in radial movement of the roller 22 cause deflections of the metal strip 23 and these are sensed by strain gauge 23a and transmitted to the trolley 4 by the conductors 23b and cable 2.

When the carriage reaches the top of its traverse, the operation of the winch is continued so increasing the tension in the cable 2. As a result the sliding sleeve 16 and spindle 16a are pulled through the hole 14, and the shoulder 18 compresses spring 19. So also the spindle 16a is pulled upwards sufficiently to cause the shoulder 21 to engage knuckle 28 and retract rollers 22. When this last motion has been taken up further pulling on the cable 2 acts through pivot pins 44 so that, by virtue of the contact angle between the grippers and the bore wall, the grippers 45 rotate just sufficiently to relax their grip on the bore wall.

Then with the grippers 45 sliding along the bore wall, the whole probe is raised by the cable up the bore through an increment of channel length which overlaps the first traverse of the carriage. The probe 1 is then lowered slightly and the grippers re-emerge automatically under spring action to engage the channel wall more positively. As the cable is relaxed so the grippers transfer the probe weight on to the channel wall relieving the cable of the weight of the probe. The cable is then payed out to lower the carriage on to end stop 9b and all is set for a second traverse of the carriage. The cycle then begins again.

In a modified form the carriage may be a slider mounted on a track comprising parallel rods or rails which extend between the nose piece and tail piece of the probe. Also instead of using strain guages to measure displacement of measuring rollers 22, a displacement transducer may be employed which uses electrical inductance as the parameter by which the displacements of the centres of rollers 32 are measured.

Figure 4:
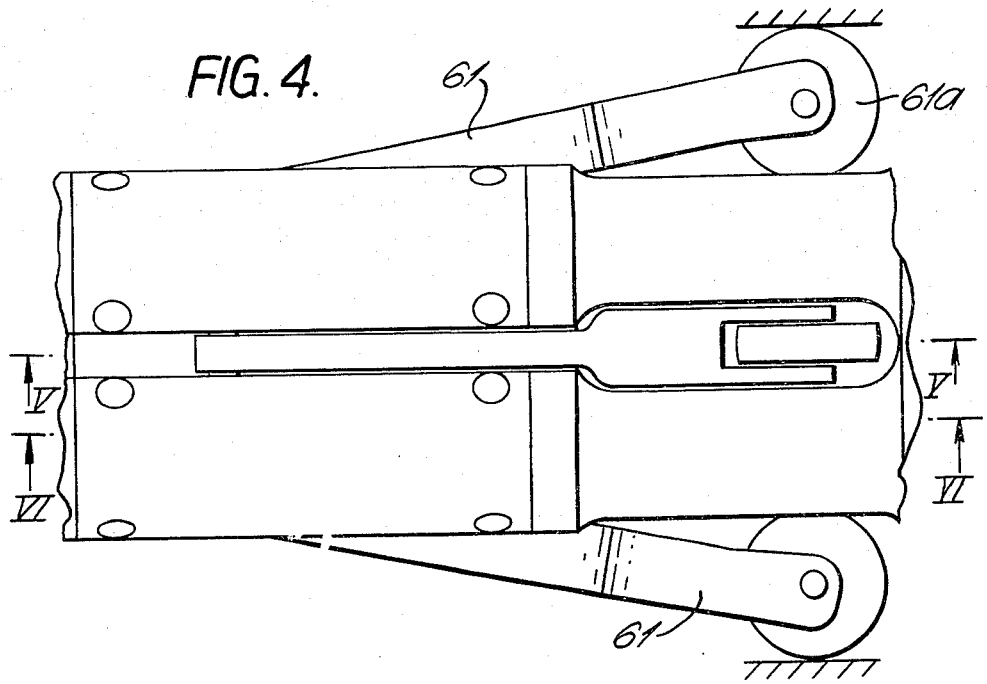
FIG. 4 shows an elevation of an alternative transducer.
Figure 5:
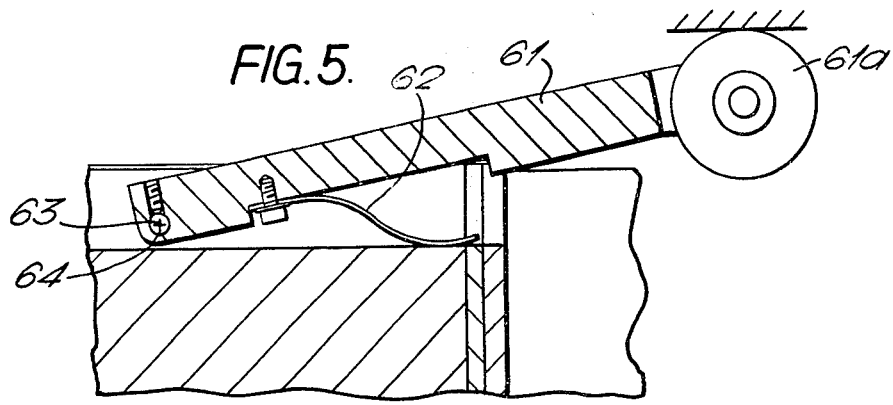
FIG. 5 is a section on the line V—V of FIG. 4.
Figure 6:
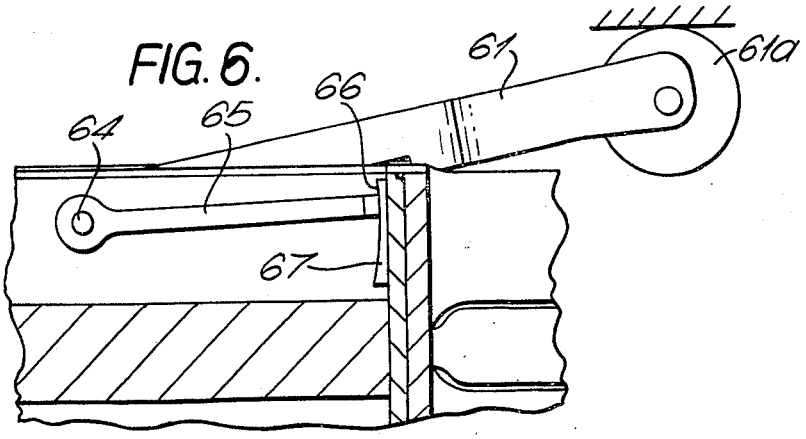
FIG. 6 is a section on the line VI—VI of FIG. 4

The alternative transducer for the carriage is shown in FIGS. 4, 5 and 6. As shown there are four feeler arms 61 at 90° spacing around the carriage periphery. Each has a leaf spring 62 which bears on a surface within the carriage and biases the arm about its pivotal axis 63 outwardly to engage via roller 61a, the channel wall. The pivot for each arm 61 is a trunnion pin 64 carried in bearings (not shown). One end of the pin 64 protrudes through its bearing and carries at its end an arm 65. The free end of the arm 65 is an electric contact slider 66 co-operating with poteniometer winding 67. By connecting the slider 66 and winding 67 into a variable resistance measuring circuit, the position of the slider 66 which rotates as one with the feeler arm 61 may be gauged. Hence the profile of the channel may be gauged.

If desired the carriage may carry other measuring transducers, such as thermocouples.

I claim:

1. Measuring apparatus for making measurements within a downwardly extending channel, the apparatus comprising an elongated probe, a probe support means for suspending the probe within the channel at successive stepwise points therealong, an electrical conductor associated with the probe support means, a measurement indicator connected to the conductor exteriorly of the channel, the probe including an anchorage means for the probe support means, a track which extends parallel and stationary relative to to the longitudinal axis of the probe, a carriage captive on the track and movable therealong, a measuring transducer mounted on said carriage and having an electrical output connected electrically to the conductor and means for moving the carriage along the track to take measurements while the probe is stationary.

2. Measuring apparatus as claimed in claim 1 in which the probe comprises end members between which said track extends, for limiting the movement of said carriage, and an anchorage means for the cable on the carriage.

3. Measuring apparatus as claimed in claim 1 in which the probe includes end members between which said track extends, for limiting the movement of said carriage, a plurality of measuring transducers mounted on the carriage, each of said transducers having an electrical output, channel wall gripping means mounted on the probe and extensible into engagement with the channel wall to support the probe from the wall while the carriage is moved along the track.

4. Measuring apparatus as claimed in claim 1 in which the probe has freely pivoted grippers mounted thereon, the grippers arranged to rock into a partially extended position in sliding engagement with the channel wall when the probe support means is under tension and to rotate into a fully extended position when the tension is relaxed thereby to support the probe from the channel wall.

5. Measuring apparatus as claimed in claim 1 in which the probe support means is a cable and a drum is provided for the cable on a trolley external to the channel, the trolley providing a mounting for the measuring indicator.

6. Measuring apparatus for making measurement within a downwardly extending channel by means of transducers lowered into the channel on a probe which is suspended by a cable which also transmits electrical outputs from the transducers to an indicator remote from the probe, the probe including pivotal grippers which are biased into sliding contact with the channel wall and extensible to grip the channel wall to support the probe, a track, a carriage carrying transducers and captive on the track, first and second end members limiting the movement of the carriage, an anchorage for the cable on the carriage and an electrical connection between the transducers and the cable, the carriage supporting feeler arms biased into contact with the channel wall and operatively coupled to a transducer on the carriage, said transducer yielding an electrical output in accordance with the movements of the feeler arms.

7. Measuring apparatus as claimed in claim 6 in which the probe is a slotted tubular body, the interior face of which forms a track for a captive carriage, and end members defining the limits of movement of the carriage.

8. Measuring apparatus as claimed in claim 6 in which the transducer comprises a variable electrical resistance having a slider arm movable in accordance with the movements of the feeler arm.

9. Measuring apparatus as claimed in claim 6 in which the transducer comprises a member which undergoes mechanical strain to a degree which varies in accordance with the movements of the feeler arm and an electrical resistance strain gauge applied to said member to yield the electrical output.

10. Measuring apparatus as claimed in claim 6 in which the first end member has a first extensive piece, said first extension piece providing a mounting for the pivotal grippers.

11. Measuring apparatus as claimed in claim 6 in which the second end member has a second extension piece, said second extension piece providing a mounting for a set of steady rollers for spacing the probe from the channel wall.

* * * * *